US012735244B2

(12) United States Patent
Vizzio

(10) Patent No.: US 12,735,244 B2
(45) Date of Patent: Sep. 15, 2026

(54) WASTE BAG GAUGE

(71) Applicant: Paul Joseph Vizzio, New York, NY (US)

(72) Inventor: Paul Joseph Vizzio, New York, NY (US)

( * ) Notice: Subject to any disclaimer, the term of this patent is extended or adjusted under 35 U.S.C. 154(b) by 215 days.

(21) Appl. No.: 18/423,398

(22) Filed: Jan. 26, 2024

(65) Prior Publication Data

US 2024/0400292 A1 Dec. 5, 2024

Related U.S. Application Data

(60) Provisional application No. 63/470,856, filed on Jun. 3, 2023.

(51) Int. Cl.
*B65D 83/08* (2006.01)
*B65F 1/00* (2006.01)

(52) U.S. Cl.
CPC ........ *B65D 83/0805* (2013.01); *B65F 1/0006* (2013.01); *B65F 2240/136* (2013.01)

(58) Field of Classification Search
CPC .......................... B65D 83/0805; B65F 1/0006
See application file for complete search history.

(56) References Cited

U.S. PATENT DOCUMENTS 1,738,721 A * 12/1929 Morin ..................... G07F 11/68 224/29.5
2,139,339 A * 12/1938 Vaughan ............ A47K 10/3637 225/41
3,260,402 A * 7/1966 Lareau ................... B65H 1/266 271/42
4,204,180 A * 5/1980 Usui .................... B65H 23/005 242/563.2
2004/0135027 A1 * 7/2004 Elliott ................ A47K 10/3687 242/563
2006/0214048 A1 * 9/2006 Sucher ................... B65H 16/06 242/598.5
2007/0267531 A1 * 11/2007 Petersen .............. A01K 27/008 242/588.6
2008/0073456 A1 * 3/2008 Goeking ............ A47K 10/3818 242/563
2009/0194553 A1 * 8/2009 Hoefing ............. A47K 10/3827 221/45
2009/0277922 A1 * 11/2009 Lifschitz ............ B65D 83/0805 221/34
2012/0279984 A1 * 11/2012 Brolin .................. A47K 10/426 221/197
2017/0233136 A1 * 8/2017 Cartledge .......... B65D 21/0228 222/130
2017/0240343 A1 * 8/2017 Kryscio ................. B65D 85/67
(Continued)

*Primary Examiner* — Gene O Crawford
*Assistant Examiner* — Kelvin L Randall, Jr.

(57) ABSTRACT

A dog waste bag dispenser device that includes a gauge that is connected to a plurality of waste bags through a plurality of linkages such that the remaining bags inside the device is shown outside of the device. The device includes an axle assembly allowing for bag rolls and allows a user to easily remove a dog waste bag from the dog waste bag roll. The device includes a plurality of protrusions which allows an attachment strap to connect the device to objects in multiple ways for easy portability. The device includes protrusions allowing for items to be attached such as used dog waste bags or other articles which will fit within the protrusions.

1 Claim, 8 Drawing Sheets

(56) References Cited

U.S. PATENT DOCUMENTS

| | | | | |
|---|---|---|---|---|
| 2018/0249870 | A1* | 9/2018 | Achton | B65H 16/005 |
| 2023/0242298 | A1* | 8/2023 | Zeitz | B65D 51/28 |
| | | | | 119/161 |

* cited by examiner

WASTE BAG GAUGE

CROSS REFERENCE TO RELATED APPLICATIONS

This application claims the benefit of U.S. Provisional Application No. 63/470,389, filed on Jun. 1, 2023. The entire teachings of the above applications are incorporated herein by reference.

FIELD OF THE INVENTION

The present invention relates generally to the field of dog waste collection, and more particularly to methods and systems for dog waste bag dispensing

BACKGROUND

When walking one's pet it is common to bring a device that holds pre-rolled waste bags, such as shown in U.S. Pat. No. 7,850,039B1, in order to pick up one's pet's excrement while on a walk.

Oftentimes pets will need to use one or more bags for a walk, especially if one is walking multiple pets. If one's holder has no bags left, or even if there are one or two left, this will leave one in a situation where they will need to pick up the pet's excrement, but have no waste bags left to do so.

The state of the current art is similar to that of U.S. Pat. No. 8,113,381B2, wherein small lightweight devices are added to one's existing leash that hold a roll of waste bags. Though devices such as US20220356001A1 exist to show the roll as a means of estimating the number of bags left, it is very difficult to predict how many bags are left by looking at a roll. Other solutions such as US20210227794A1 include small windows to look at the roll as a means to predict how many bags are left, but this is even more difficult to use than seeing the whole roll.

Therefore, there needs to be a solution to ensure one does not run out of waste bags during a walk with their pet, while remaining small, light, and convenient.

SUMMARY OF THE INVENTION

The present invention can provide an apparatus which attaches to one's existing leash that can hold a roll of waste bags. The apparatus can contain a mechanism that sits against the roll of bags such that when bags are removed the mechanism also moves, this motion can be used to create a gauge visible on the outside of the apparatus to show how many bags remain in the apparatus. The apparatus can contain a quick and easy to operate opening mechanism to allow for roll replacement during a walk. The apparatus can be designed to work with most waste bag rolls. The apparatus can be designed to be as small as possible with minimal empty space to keep it lightweight and of minimal inconvenience to the user. Together, this allows for an apparatus which is more convenient and easier to use than in the prior art, while remaining light and small.

The device can include a member rotatably attached to an outside housing through the use of a shaft. The device can include a spring that pushes the end of the member against the outside of the waste bag roll. In some embodiments there can be a flexible sheet that can attach to the end of the rigid shaft. The flexible sheet can fit through channels in the outer housing and can be visible on the outside of the housing through openings. When waste bags are used, the flexible sheet position can change and this can be used as a visible gauge to show the amount of waste bags remaining.

The device can include a member rotatably attached to an outside housing through the use of a shaft. The device can include a spring that pushes the end of the member against the outside of the waste bag roll. In some embodiments there can be a second member rotatably attached to the first member creating a two bar linkage. There can be cutouts in the housing to see the end of the second member which can act as a visual gauge. When waste bags are used, the position of the end of the second member can change and this can be used as a visible gauge to show the amount of waste bags remaining. In some embodiments there can be an additional piece attached to the end of this second member to create a larger visual gauge.

In some embodiments there can be one flexible sheet rigidly attached to the housing. This flexible sheet may travel through channels in the outer housing and can be visible on the outside of the housing through openings. When waste bags are used, the flexible sheet position can change and this can be used as a visible gauge to show the amount of waste bags remaining.

In some embodiments, the gauge can be added to any apparatus which holds a waste bag roll. The gauge can be used to show the number of bags left on in-use waste bag rolls. The gauge alternatively can be used to show if there is a spare roll inside of a spare roll holding space.

In some embodiments the gauge can use a color scale to show the current state of waste bags left. This can also be used as a binary full or empty to show when no roll is inserted in the apparatus.

In some embodiments the gauge can use an alphanumerical scale to show the current state of waste bags left. This can also be used as a binary full or empty to show when no roll is inserted in the apparatus.

In some embodiments the gauge can use shapes to show the current state of waste bags left. This can also be used as a binary full or empty to show when no roll is inserted in the apparatus.

The device can include a large opening for the in-use waste bag roll. The opening is designed so that one's fingers can fit to pull out the first bag of the roll and for any bags that may get stuck during use. The opening is used to pull bags out of the apparatus one at a time.

The device can include a series of loops along the outside such that a strap can be attached to the device, which can then attach to one's existing leash. The device and strap can be configured to one's preference. The device and strap can be attached to a leash to allow for a long hanging application. The device and strap can instead be attached to a leash to allow for a tight hanging application. In particular embodiments this strap can be made of many types of materials such as cloth, leather, synthetic strapping, metal, plastic, rubber, silicone, and other similar materials.

The device can include two halves containing space to hold a waste bag roll. Each half can have small shafts onto which waste bag rolls can rotatably mount onto. The shafts allow for smooth operation of the in-use waste bag roll, along with consistent holding of the spare roll during use.

In one embodiment the apparatus can be comprised of two halves screwably attached through the use of threads.

In one embodiment the apparatus can be comprised of two halves rotatably attached through the use of a hinge and shaft. In other embodiments, the apparatus may use other hinge designs such as a living hinge, a shaft directly on the halves, or other hinge designs known to those in the art. In some embodiments, a spring or similar mechanism can be added to the hinge to help in opening and closing of the apparatus.

In one embodiment the apparatus can have a clip to secure the two halves closed. In one embodiment this clip can be hidden inside of the device for aesthetic purposes. In other embodiments the clip can be on the outside, of a different size, of a different shape, and include other elements known to those in the art In one embodiment, the two halves can be not attached to one another permanently. The halves can be removed from one another and attached together through the use of clips, friction fits, clasps, straps, hooks, or other mechanisms known to those in the art.

In some embodiments, the outer housing can have a rigid protrusion to help with ripping a waste bag off of the roll In some embodiments, the outer housing can have protrusions that allow for used waste bags to be attached In some embodiments, the parts can be made of rigid materials such as plastics, metals, and composites.

In some embodiments, the parts can be made of a combination of soft and rigid materials such as fabrics, cloth, silicone, and rubber.

BRIEF DESCRIPTION OF DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

A DETAILED DESCRIPTION

Figure 1:
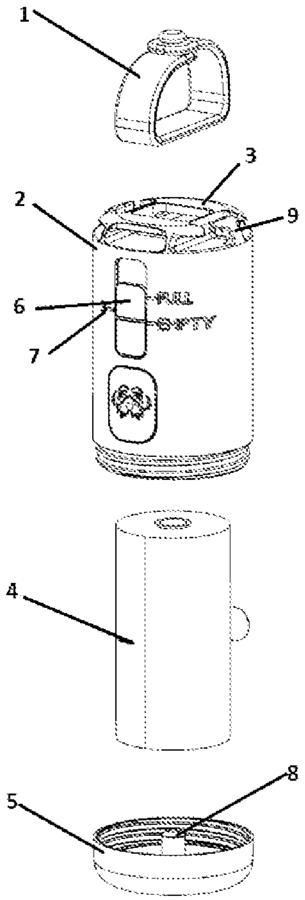
FIG. 1 is an isometric view of an embodiment of the apparatus opened, ready to load a waste bag roll, and with strap removed
Figure 4:
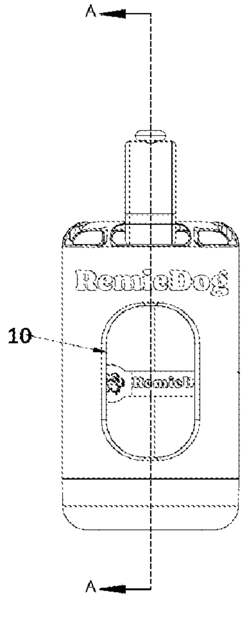
FIG. 4 is a front view of an embodiment with a section line that will be used for FIG. 5 and FIG. 6

Details of some embodiments of the apparatus in the present invention are described below Referring to FIG. 1, in some embodiments of the apparatus there may be a lower housing 5 screwably attached to an upper housing 2. The upper housing 2 may have several cutouts 3 that allows for a strap 1 to be routed through. The lower housing 5 and upper housing 2 may have shafts 8 that allow a waste bag roll 4 to be securely housed. In some embodiments there may be protrusions 9 in the outer housing 2 that allow for attaching external pieces to such as modular attachments and used waste bags. In some embodiments there may be a cutout 10 (FIG. 4) through which bags 4 can be pulled out of the device.

Figure 2:
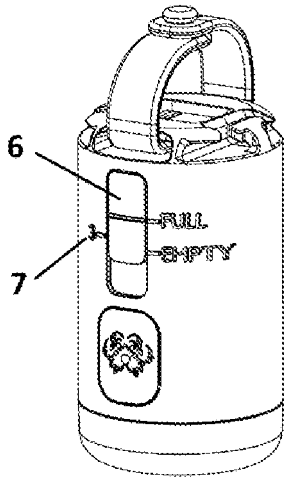
FIG. 2 is an isometric view of an embodiment where the waste bags are full
Figure 3:
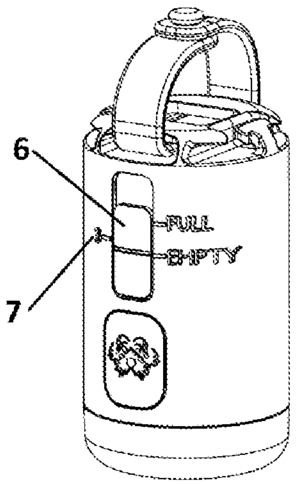
FIG. 3 is an isometric view of an embodiment where the waste bags are empty

In some embodiments, there may be an external gauge 6 (FIG. 1) that can be in different positions along the upper housing 2 (FIG. 1) to show the level of bags left in the apparatus (FIG. 2 and FIG. 3). In some embodiments this may be through alphanumeric markings, shapes or through colors shown by markings 7. In some embodiments the markings can show critical levels such as 3 bags left, full, and empty.

Figure 5:
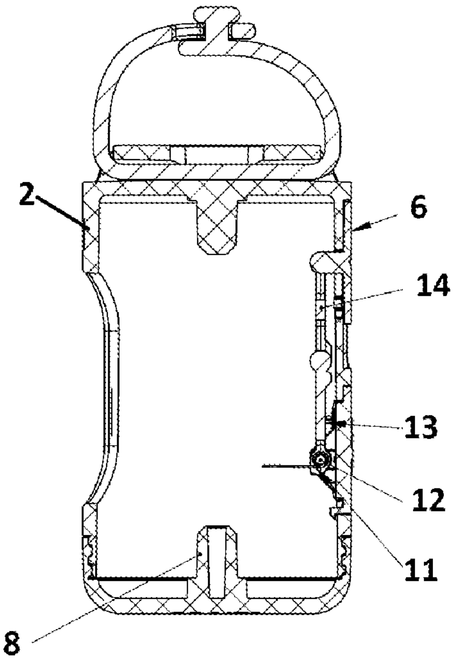
FIG. 5 is a section view of an embodiment where the waste bags are full
Figure 6:
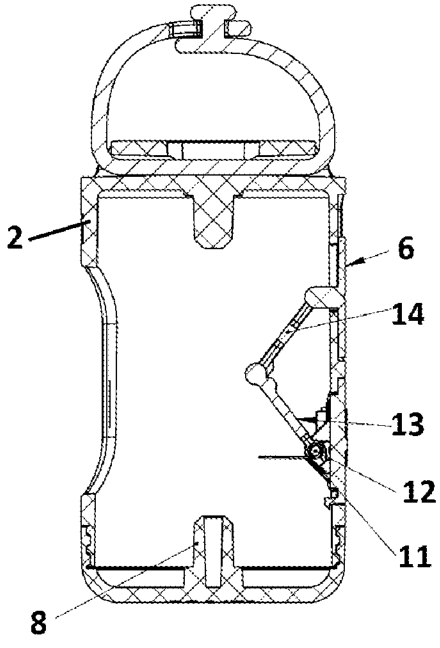
FIG. 6 is a section view of an embodiment where the waste bags are empty

Referring to FIG. 5 and FIG. 6, in some embodiments there may be a lower member 13 rotatably connected to the outer housing 2 through the use of a shaft 12. This lower member 13 may be rotatably connected to an upper member 14 through a pin and hole. This upper member 14 may be connected to an external viewing gauge 6. The lower member 13 may have a spring 11 that acts to push the lower member 13 against the outside of the waste bags.

Figure 7:
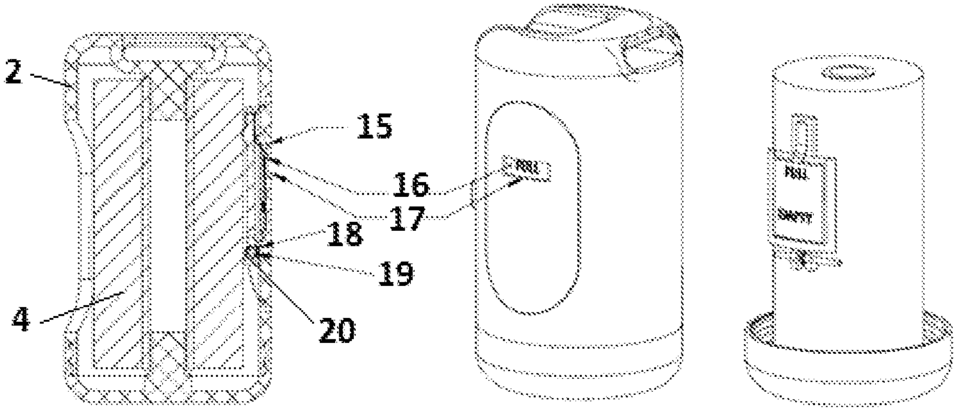
FIG. 7 contains a section view, isometric view, and an isometric view with hidden components of an embodiment where the waste bags are full FIG. 8 contains a section view, isometric view, and an isometric view with hidden components of an embodiment where the waste bags are empty FIG. 9 contains a section view, isometric view, and an isometric view with hidden components of an embodiment where the waste bags are full FIG. 10 contains a section view, isometric view, and an isometric view with hidden components of an embodiment where the waste bags are empty FIG. 11 contains a section view, isometric view, and an isometric view with hidden components of an embodiment where the waste bags are full FIG. 12 contains a section view, isometric view, and an isometric view with hidden components of an embodiment where the waste bags are empty
Figure 8:
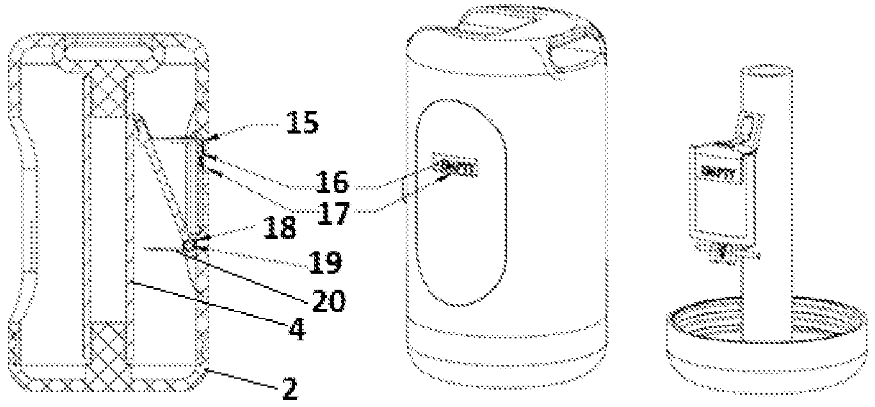

Referring to FIG. 7 and FIG. 8, in some embodiments there may be a member 18 rotatably connected to the outer housing 2 through the use of a shaft 19. This member 18 may be rigidly connected to a flexible sheet 16. This flexible sheet may be routed through a channel 15 in the housing and visible on the outside through a window 17. The member 18 may be attached to a spring 20 that acts to push the member 18 against the outside of the waste bags 4. The flexible sheet 16 may contain alphanumeric markings, shapes, or colors that will show through window 17 to indicate how many bags are left in the apparatus.

Figure 9:
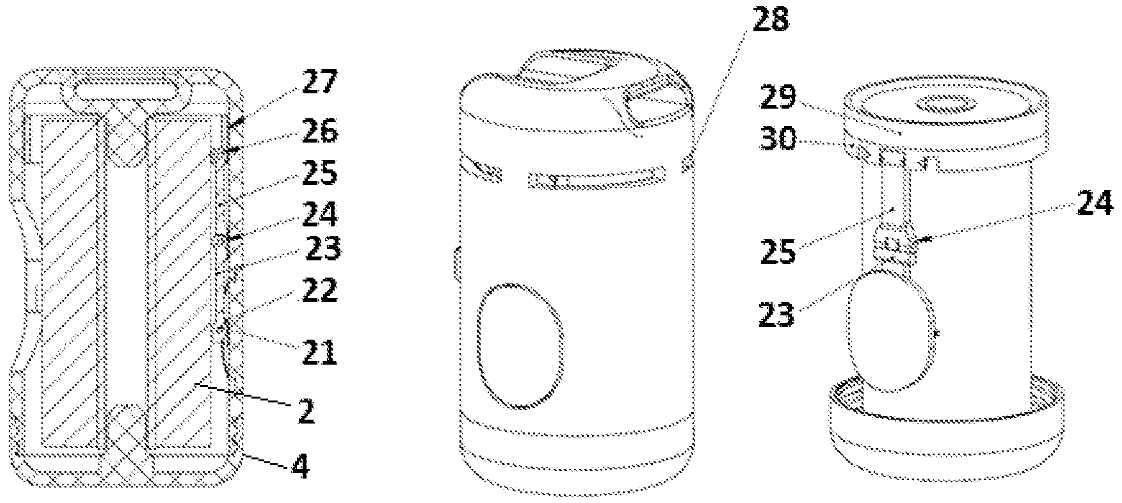
Figure 10:
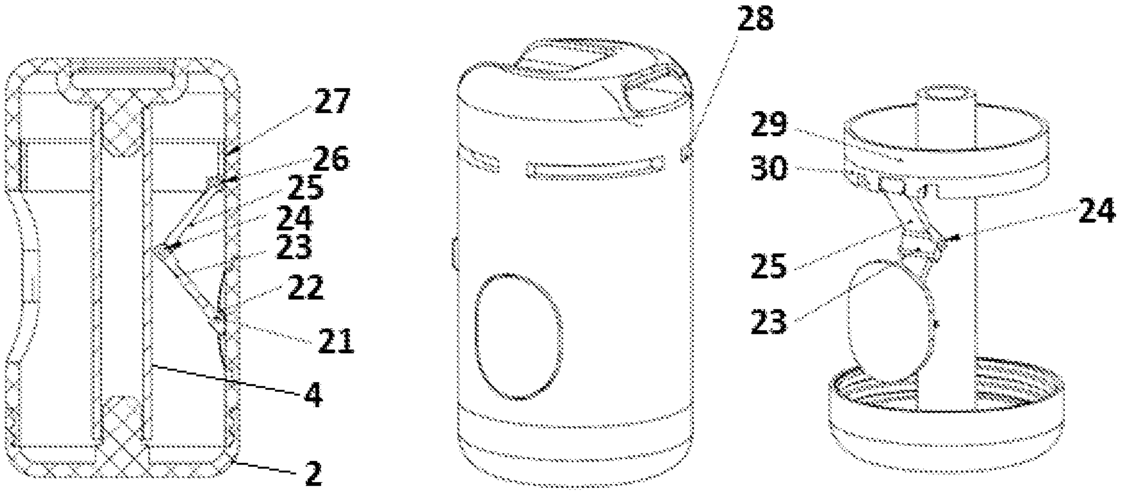

Referring to FIG. 9 and FIG. 10, in some embodiments there may be a lower member 23 rotatably connected to the outer housing 2 through the use of a shaft 21. This lower member 23 may be rotatably connected to an upper member 25 through the use of a shaft 24. This upper member 25 may be connected to an external viewing gauge 27 by a shaft 26. The lower member 23 may have a spring 22 that acts to push the lower member 23 against the outside of the waste bags 4. The apparatus may have a series of cutout windows 28 that will show the gauge 27. The gauge 27 may be subdivided into segments such as 29 and 30 which will show alphanumeric characters, shapes, or colors that will be visible through windows 28 depending on the level of bags left in the apparatus.

Figure 11:
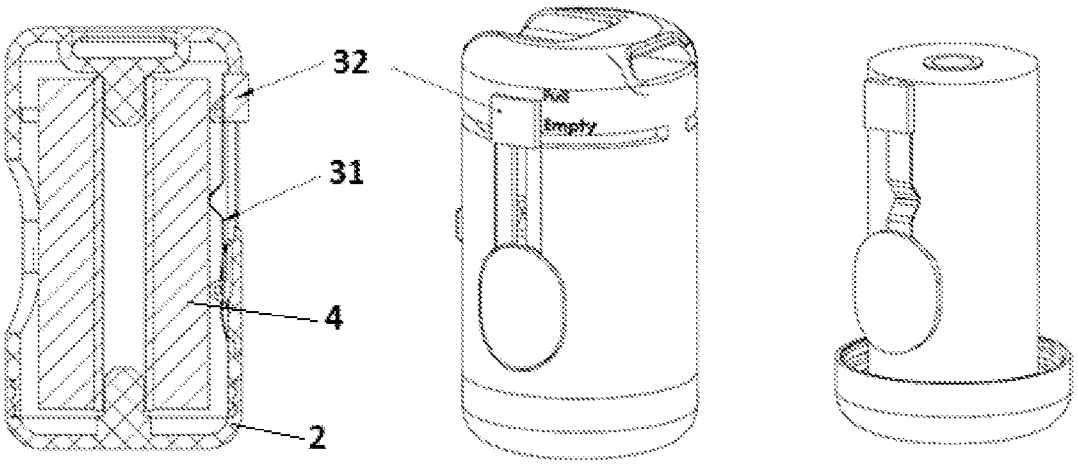
Figure 12:
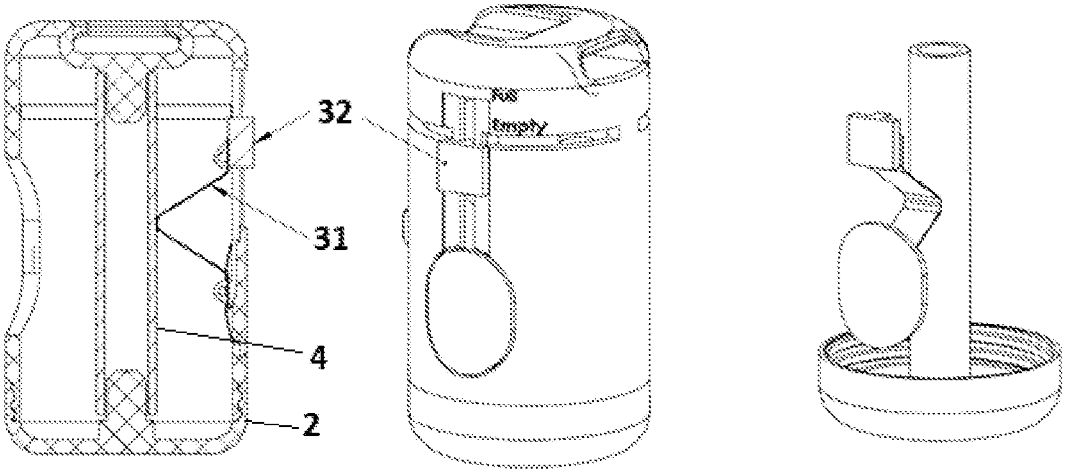

Referring to FIG. 11 and FIG. 12, in some embodiments there may be a flexible sheet 31 that attaches to the outer housing 2 and an externally viewable gauge 32. The flexible sheet 31 acts as a spring which touches the outside of the waste bags 4. The flexible sheet 31 will change the position of the gauge 32 based on how many waste bags remain in the apparatus.

Figure 13:
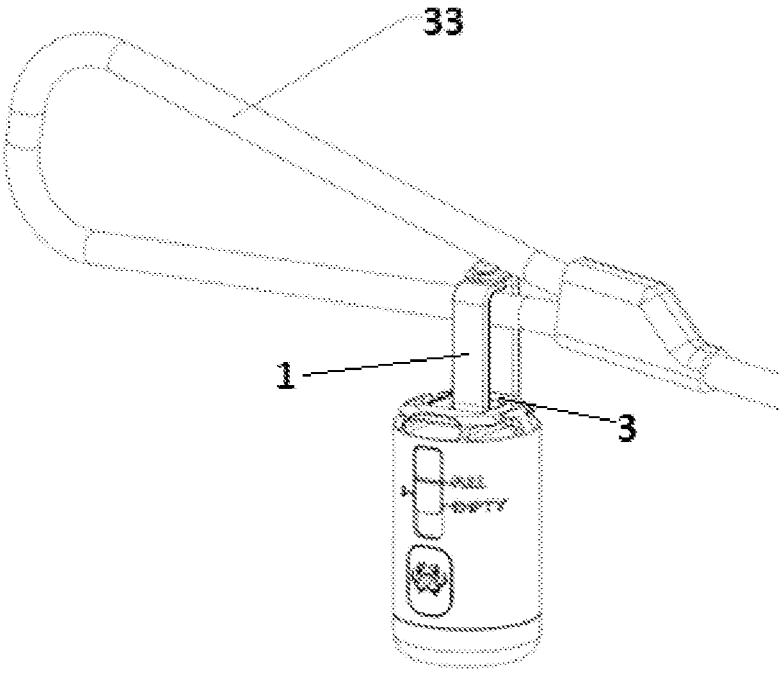
FIG. 13 is an isometric view of an embodiment where the device is attached to a leash in the loose strap setting

Referring to FIG. 13, in some embodiments the apparatus may be loosely connected to a leash 33 by routing a strap 1 through cutouts 3 in the apparatus.

Figure 14:
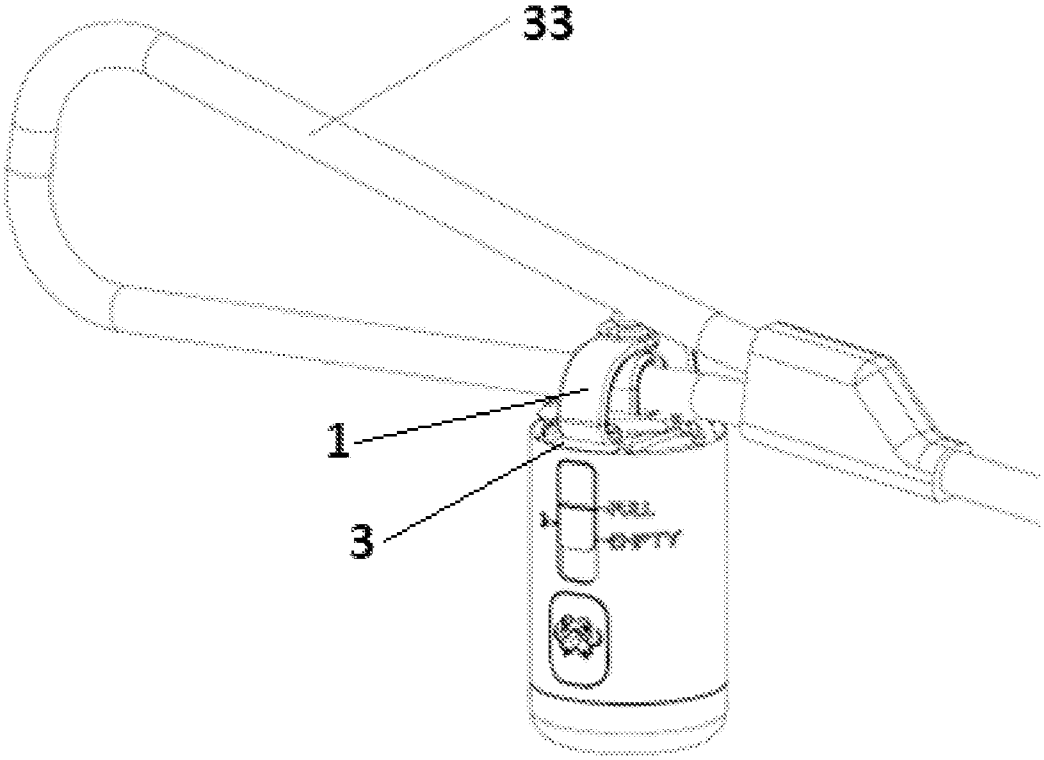
FIG. 14 is an isometric view of an embodiment where the device is attached to a leash in the tight strap setting

Referring to FIG. 14, in some embodiments the apparatus may be tightly connected to a leash 33 by routing a strap 1 through cutouts 3 in the apparatus.

Figure 15:
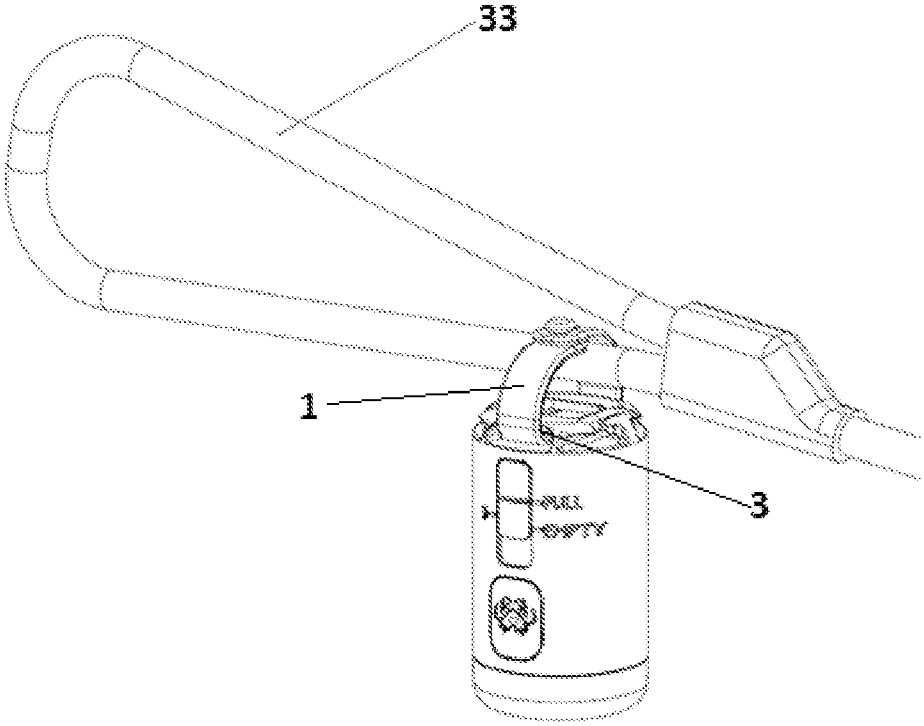
FIG. 15 is an isometric view of an embodiment where the device is attached to a leash in the medium strap setting

Referring to FIG. 15, in some embodiments the apparatus may be connected at a medium setting to a leash 33 by routing a strap 1 through cutouts 3 in the apparatus.

Figure 16:
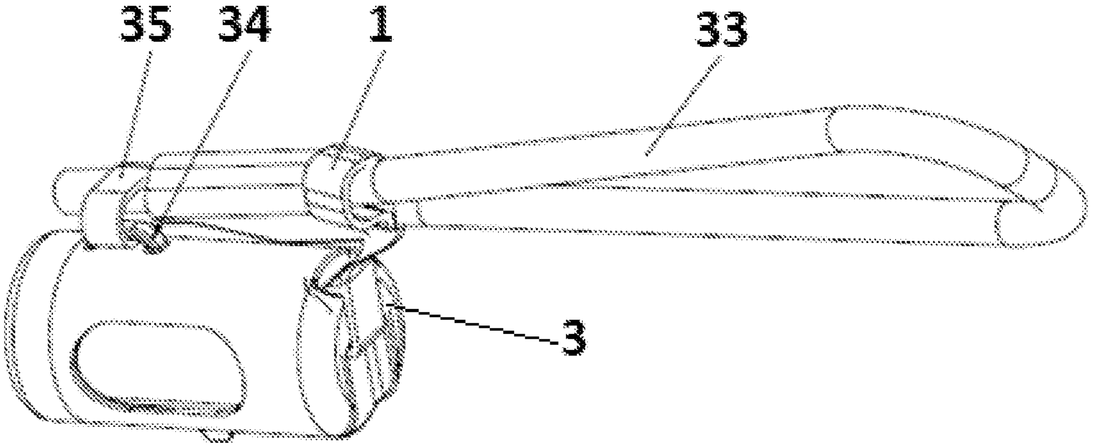
FIG. 16 is a perspective view of an embodiment with a strap that allows for a secure attachment to a leash

Referring to FIG. 16, in some embodiments the apparatus may be tightly connected to a leash 33 through a strap 1 routed through cutouts 3 in the apparatus and then by a strap 35 routed through cutout 35 in the apparatus.

What is claimed is:

1. A dog waste bag dispenser device, comprising:

an externally visible linear gauge configured to move transversely along the housing in substantial proportion to the remaining thickness of a waste bag roll;

a plurality of linkages including a double-pivot arm assembly connecting the gauge to a radial outer surface of the roll of waste bags;

a plurality of markings, shapes, or colors on the gauge or housing of the apparatus to show a level of bags remaining inside the apparatus wherein insertion of a new roll automatically resets the gauge to a full position without manual user input;

and an outer housing made of a rigid material such as plastic or composite that forms an internal cavity for a waste bag roll to sit in, the cavity being compact such that the double-pivot linkage and roll are contained within a housing having a diameter less than about 1.5 times the roll diameter.

* * * * *